United States Patent
Cocchi et al.

(10) Patent No.: US 10,813,372 B2
(45) Date of Patent: Oct. 27, 2020

(54) PNEUMATICALLY-ACTUATED VALVE FOR A MACHINE FOR THE PRODUCTION OF LIQUID OR SEMI-LIQUID FOOD PRODUCTS AND MACHINE COMPRISING THE VALVE

(71) Applicant: ALI GROUP S.r.l.—CARPIGIANI, Cernusco sul Naviglio (Milan) (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 176 days.

(21) Appl. No.: 15/988,655

(22) Filed: May 24, 2018

(65) Prior Publication Data
US 2018/0343888 A1 Dec. 6, 2018

(30) Foreign Application Priority Data
Jun. 1, 2017 (IT) .................. 102017000060646

(51) Int. Cl.
*A23G 9/28* (2006.01)
*F16K 31/126* (2006.01)
(Continued)

(52) U.S. Cl.
CPC .............. *A23G 9/28* (2013.01); *A23G 9/08* (2013.01); *A23G 9/12* (2013.01); *A23G 9/225* (2013.01);
(Continued)

(58) Field of Classification Search
CPC . A23G 9/08; A23G 9/28; A23G 9/281; A23G 9/282; A23G 9/283; A23G 9/287;
(Continued)

(56) References Cited

U.S. PATENT DOCUMENTS 2,511,844 A * 6/1950 Grove .................. G05D 7/0106
251/58
3,172,420 A * 3/1965 Brown .................... F16K 1/126
137/219
(Continued)

FOREIGN PATENT DOCUMENTS

GB 2147051 A 5/1985

OTHER PUBLICATIONS

Italian Search Report dated Feb. 27, 2018 from counterpart Italian App No. 201700060646.

*Primary Examiner* — Nelson J Nieves
*Assistant Examiner* — Miguel A Diaz
(74) *Attorney, Agent, or Firm* — Shuttleworth & Ingersoll, PLC; Timothy Klima

(57) ABSTRACT

A machine for making liquid or semi-liquid food products with a plurality of deformable feeding containers, each feeding container connected to a processing chamber for processing the base mixture and including a stirrer and a thermal treatment device for the base mixture, operating in conjunction with one another to convert the base mixture into a liquid or semi-liquid product. The operative connection of each feeding container to the processing chamber to transfer the base mixture from the feeding container to the processing chamber is made by a network of withdrawing ducts through an interposed pneumatically actuated valve which can be activated and deactivated independently of the remaining valves and which includes a valve body with an inlet duct and an outlet duct, and with a shutter acting to selectively interrupt or allow the connection between the inlet duct and the outlet duct.

12 Claims, 4 Drawing Sheets

(51) Int. Cl.
*A23G 9/12* (2006.01)
*A23G 9/22* (2006.01)
*A23G 9/08* (2006.01)
*F16K 1/12* (2006.01)

(52) U.S. Cl.
CPC .............. *A23G 9/228* (2013.01); *F16K 1/126* (2013.01); *F16K 31/1262* (2013.01); *F16K 31/1266* (2013.01); *F16K 31/1268* (2013.01)

(58) Field of Classification Search
CPC ... F16K 1/126; F16K 1/14; F16K 7/00; F16K 7/14; F16K 7/17; F16K 31/1262; F16K 31/1266; F16K 31/1268; F16K 31/165
See application file for complete search history.

(56) References Cited

U.S. PATENT DOCUMENTS

| | | | | |
|---|---|---|---|---|
| 3,392,751 A * | 7/1968 | Pommersheim | ...... | F16K 31/365 137/494 |
| 3,902,696 A * | 9/1975 | Ito | ........................... | F16K 41/10 251/61.5 |
| 4,226,343 A * | 10/1980 | Fling | ........................ | B67D 1/12 222/504 |
| 5,431,302 A * | 7/1995 | Tulley | ................. | B67D 1/1213 222/14 |
| 5,494,194 A * | 2/1996 | Topper | .................... | A23G 9/28 222/146.6 |
| 5,727,713 A * | 3/1998 | Kateman | .................. | A23G 9/04 222/145.6 |
| 6,234,351 B1 * | 5/2001 | Wilcox | .................. | B65D 77/06 222/386.5 |
| 8,104,740 B2 * | 1/2012 | Igarashi | ............... | F16K 31/1268 251/331 |
| 8,256,446 B2 * | 9/2012 | Hawkins | ........... | G05D 16/0683 137/116.5 |
| 8,281,803 B2 * | 10/2012 | Mevius | .............. | G05D 16/0694 137/505.46 |
| 9,310,811 B2 * | 4/2016 | Zhou | ..................... | F16K 31/165 |
| 10,405,562 B2 * | 9/2019 | Cocchi | .................... | A23G 9/08 |
| 2005/0145278 A1 * | 7/2005 | Igawa | ................. | F16K 31/1268 137/486 |
| 2006/0127722 A1 * | 6/2006 | Nakajima | ............. | F16K 17/196 429/444 |
| 2008/0258098 A1 * | 10/2008 | Hawkins | ............... | F16K 31/165 251/366 |
| 2009/0261281 A1 * | 10/2009 | Mevius | ................. | F16K 31/165 251/118 |
| 2013/0082075 A1 * | 4/2013 | Trulaske | .............. | B67D 1/1466 222/517 |
| 2014/0083513 A1 * | 3/2014 | Zhou | .................. | G05D 16/0688 137/2 |
| 2014/0361207 A1 * | 12/2014 | Jackson | ............... | F16J 15/3208 251/367 |
| 2015/0245634 A1 * | 9/2015 | Lazzarini | ............... | A23G 9/045 366/142 |
| 2015/0260306 A1 * | 9/2015 | Arnold | ................ | F16K 31/1268 251/63.6 |
| 2017/0035074 A1 * | 2/2017 | Cocchi | .................... | A23G 9/20 |

* cited by examiner

PNEUMATICALLY-ACTUATED VALVE FOR A MACHINE FOR THE PRODUCTION OF LIQUID OR SEMI-LIQUID FOOD PRODUCTS AND MACHINE COMPRISING THE VALVE

This application claims priority to Italian Patent Application 102017000060646 filed Jun. 1, 2017, the entirety of which is incorporated by reference herein.

BACKGROUND OF THE INVENTION

This invention addresses the machine manufacturing sector relating to machines for making ice cream, more precisely, soft ice cream, and more generally speaking, liquid or semi-liquid food products.

More specifically, this invention relates to a valve forming part, in these machines, of the circuit which feeds the base product and from which, the finished liquid or semi-liquid is subsequently obtained and dispensed.

In the ice cream trade in question, (soft) ice cream machines are known which comprise a batch freezing cylinder (or chamber) associated with a refrigeration system and equipped with a stirrer.

The batch freezing cylinder allows making the finished product (ice cream or soft ice cream) from a base mixture fed from, and suitably measured and prepared in, another container.

The base mixture is fed to the batch freezing cylinder from suitable containers, that is to say, flexible feeding containers of a type known as "bag in box", which basically comprise a flexible bag whose wall is provided with an opening (which can be pierced) to allow the product out.

These flexible feeding containers are configured to deform as the product is tapped out of them; in other words, their volume depends on the quantity of product they contain.

The product withdrawn from the flexible containers is channeled to the batch freezing cylinder in the machine by a circuit consisting of a system of ducts connecting the feeding containers to the processing (batch freezing) chamber.

The ducts are each attached to a respective feeding container by means of a pneumatically operated shut-off valve which is associated in known manner to the respective container.

Each valve can be activated and deactivated independently of the other valves, if any, by a pneumatic control signal received through a respective duct connected to a source of compressed air through interposed control means driven by the main control unit of the machine.

The valve is provided with a deformable membrane, which is subjected to the air pressure generated by the pneumatic control system to drive the shut-off system, and trade operators often complain about problems with valve integrity.

In other words, there is always the risk of the membrane breaking under the pressure of the air if the valve is subjected to overpressure (for example, on account of the faulty operation of the control and drive system) or on account of wear or problems with valve material structure or sudden pressure changes, allowing the pressurized air to pass through the valve body and to reach the flexible feeding container, causing it to burst and spilling its contents inside the machine.

In the very undesirable event of this happening, the machine must be shut down and thoroughly cleaned to restore proper hygienic conditions and correct machine operation. Moreover, the product wasted and the need to replace the broken container with a new one full of product are also factors to be taken into account.

Therefore, a need that is felt particularly strongly in the trade is to be able to rely on robust valves which can guarantee a more resistant drive system and which will in no way allow the compressed air used to drive them to reach the flexible containers they are connected to.

SUMMARY OF THE INVENTION

This disclosure therefore has for an aim to overcome the above described drawbacks and that is to say, to meet the above mentioned need.

More specifically, the aim of this disclosure is to provide a valve for controlling the supply of products withdrawn from corresponding flexible containers in a machine for making ice cream or liquid or semi-liquid products with a constructional configuration such as to ensure correct operation at all times or in any case to prevent the pressurized air used for its operation from reaching the container it is connected to.

Another aim of this disclosure is to provide a machine for making liquid or semi-liquid products equipped with the above mentioned valve, which prevents the pressurized air used for its operation from breaking the flexible containers and causing the base products contained therein to spill into the machine, and which thus avoids prolonged machine down time.

According to the disclosure, this aim is achieved by a valve and a machine forming the object of the disclosure and comprising the technical features described in one or more of the appended claims.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

DESCRIPTION OF THE PREFERRED EMBODIMENTS

With reference to the accompanying drawings, the numeral 1 denotes an apparatus or machine for making liquid or semi-liquid products.

In particular, the machine 1 allows making ice cream products. More precisely, the machine 1 allows making one or more of the following products: artisan gelato, soft ice cream, sorbets.

Figure 1:
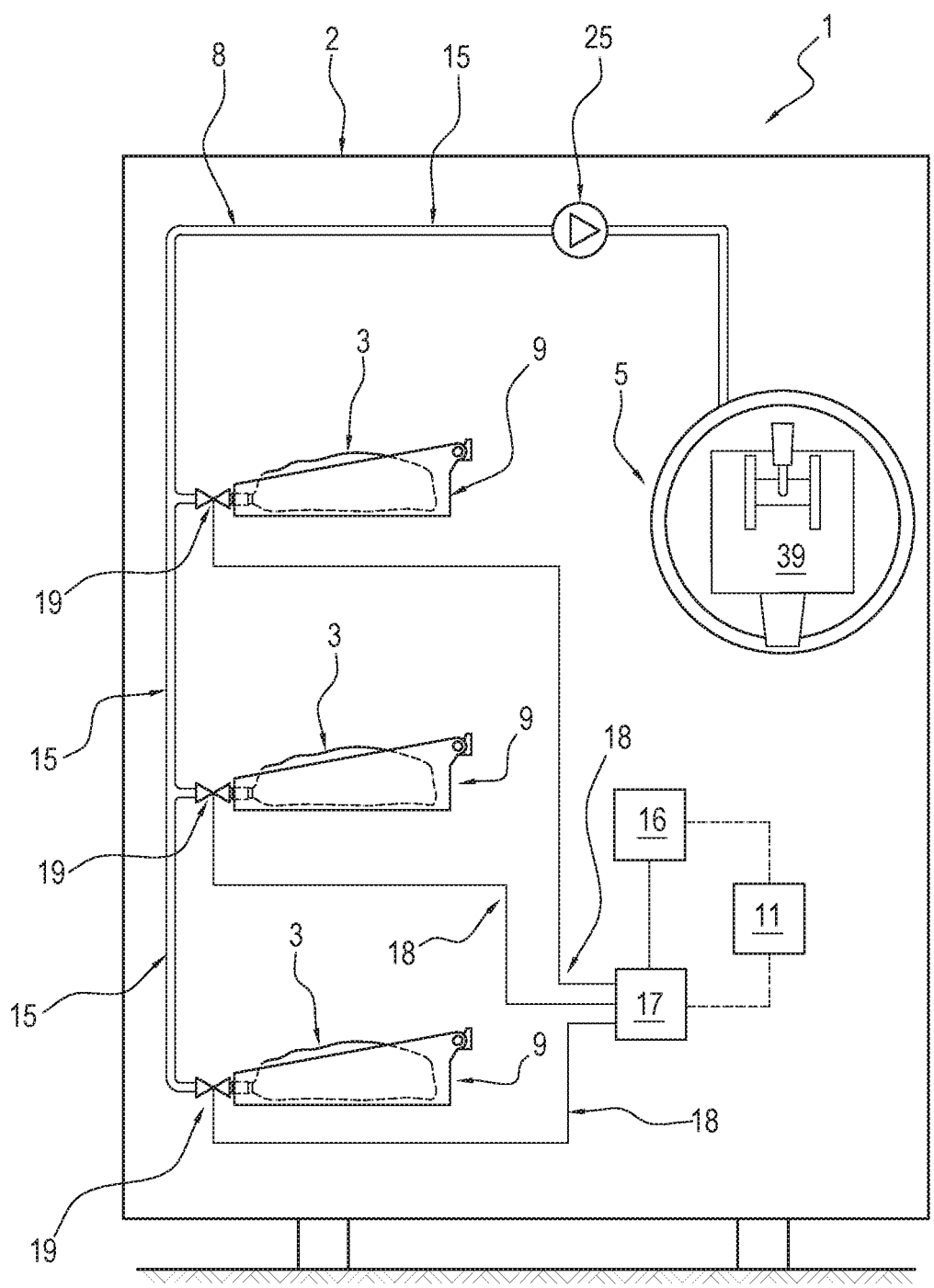
FIG. 1 is a schematic side view of a machine for making liquid or semi-liquid products comprising the valve of this disclosure.

More in detail and with reference to FIG. 1, the machine 1 comprises a frame 2 in which feeding containers 3 are mounted (for example, three such containers are shown in FIG. 1 but there might be any number of them). Each feeding container 3 has a deformable wall and contains a liquid or semi-liquid base mixture. Thus, the volume occupied by each first container 3 depends on a quantity of base mixture or additive product contained therein.

The containers 3 are placed on suitable supporting means 9, operatively associated with the frame 2, and are connected to a network 15 of withdrawing ducts 8.

Operating in the network 15 of ducts 8, there is a pump 25 (at least one), for example a peristaltic pump, which withdraws the base mixture, or the additive product, from the feeding containers 3 and sends it through the end section of the network 15 of ducts 8 to a processing chamber 5 (more precisely, a batch freezing chamber).

It should be noted that in an embodiment not illustrated, each feeding container 3 might be connected to the batch freezing chamber 5 by a respective connecting duct 8 and related pump 25 (the connecting duct 8 and the related pump 25 being dedicated specifically to one and one only feeding container 3).

Preferably, the transfer pump 25 is operatively connected to each of the feeding containers 3: it should be noted that the valve 19, when it is in the open position, allows establishing the fluid connection between the respective feeding container 3 and the pump 25, whilst when it is in the closed position, it inhibits the fluid connection between the respective feeding container 3 and the pump 25.

In the processing chamber 5, the base mixture is mixed by a stirrer, while the thermal treatment means act in conjunction with the stirrer to convert the base mixture into a liquid or semi-liquid product.

It should be noted that the means for thermally treating the basic mixture comprise a thermodynamic system (not illustrated) equipped with at least one heat exchanger (evaporator) associated with the processing chamber 5.

Preferably, the thermal system comprises a hydraulic circuit provided with a heat exchanger fluid and which operates according to a thermodynamic cycle.

The transfer pump 25, which is operatively interposed between the feeding containers 3 and the processing chamber 5, thus transfers the products from the feeding containers 3 to the processing chamber 5.

In the embodiment illustrated in FIG. 1, the withdrawing ducts 8 connecting the feeding containers 3 to the processing chamber 5, are configured to allow operatively connecting each of the feeding containers 3 (selectively) to the processing chamber 5 and withdrawing the base mixture, or the additive product, as required in each case and in the required quantity, from each of the feeding containers 3.

The general operation of the machine 1 and its components is guaranteed and controlled by an electronic, operation and control unit 11.

More specifically, for the selective connection of the feeding containers 3 to the withdrawing ducts 8, there is a plurality of pneumatically actuated valves 19, each of which is associated with one of the feeding containers 3.

An interface (not illustrated) is connected to the operation and control unit 11 of the machine 1 and its components and is provided with control commands, which can be operated to control the valves 19 in such a way as to (selectively) place one of said feeding containers 3 in fluid communication with the processing chamber 5.

In practice, the interface allows sending a control signal to the operation and control unit 11 which in turn, as a function of the control signals received, selectively opens one of the valves 19 (based on the selection made).

Figure 2:
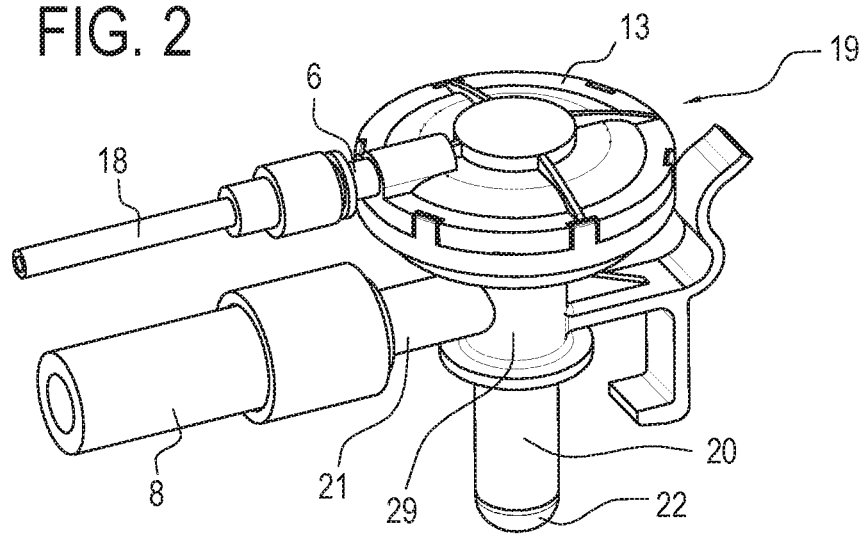
FIG. 2 is a schematic perspective view of the valve mounted on the machine of FIG. 1 for making liquid or semi-liquid products.
Figure 3:
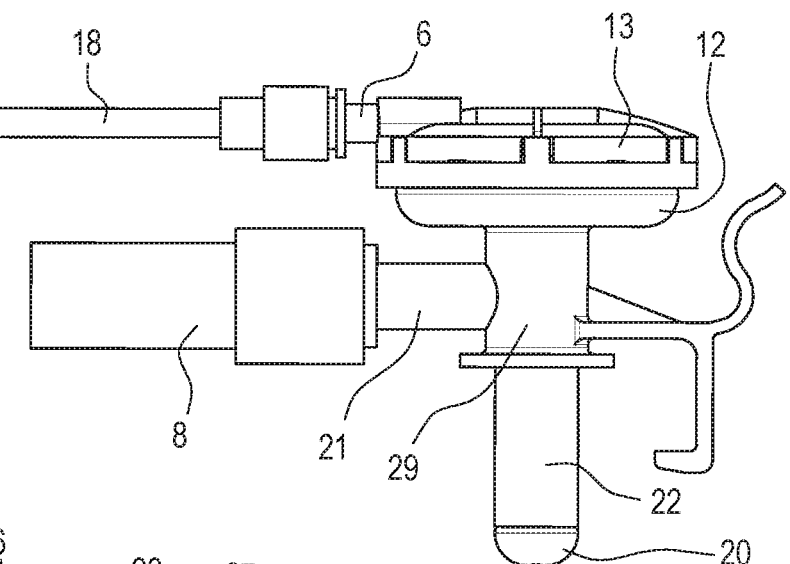
FIGS. 3 and 4 are, respectively, a full side view and a cross-sectional side view of the valve of FIG. 2.
Figure 4:
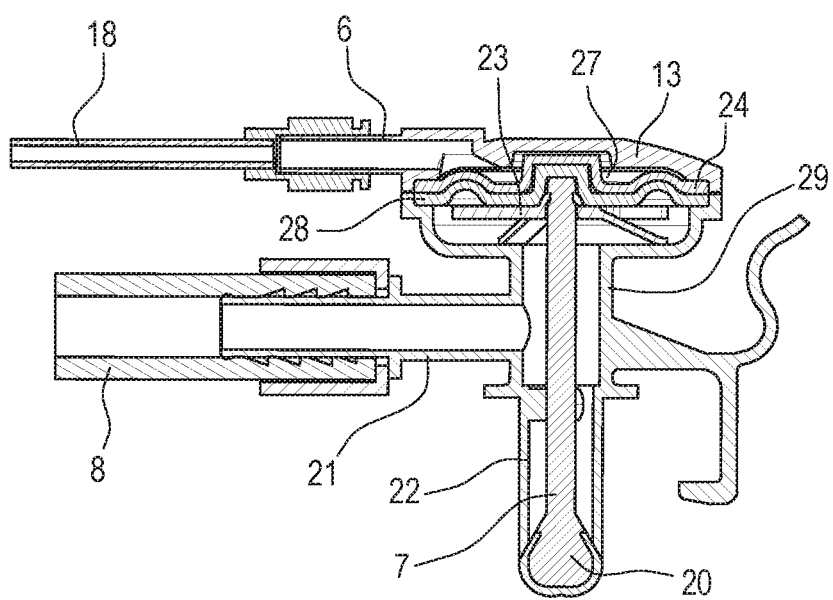
Figure 5:
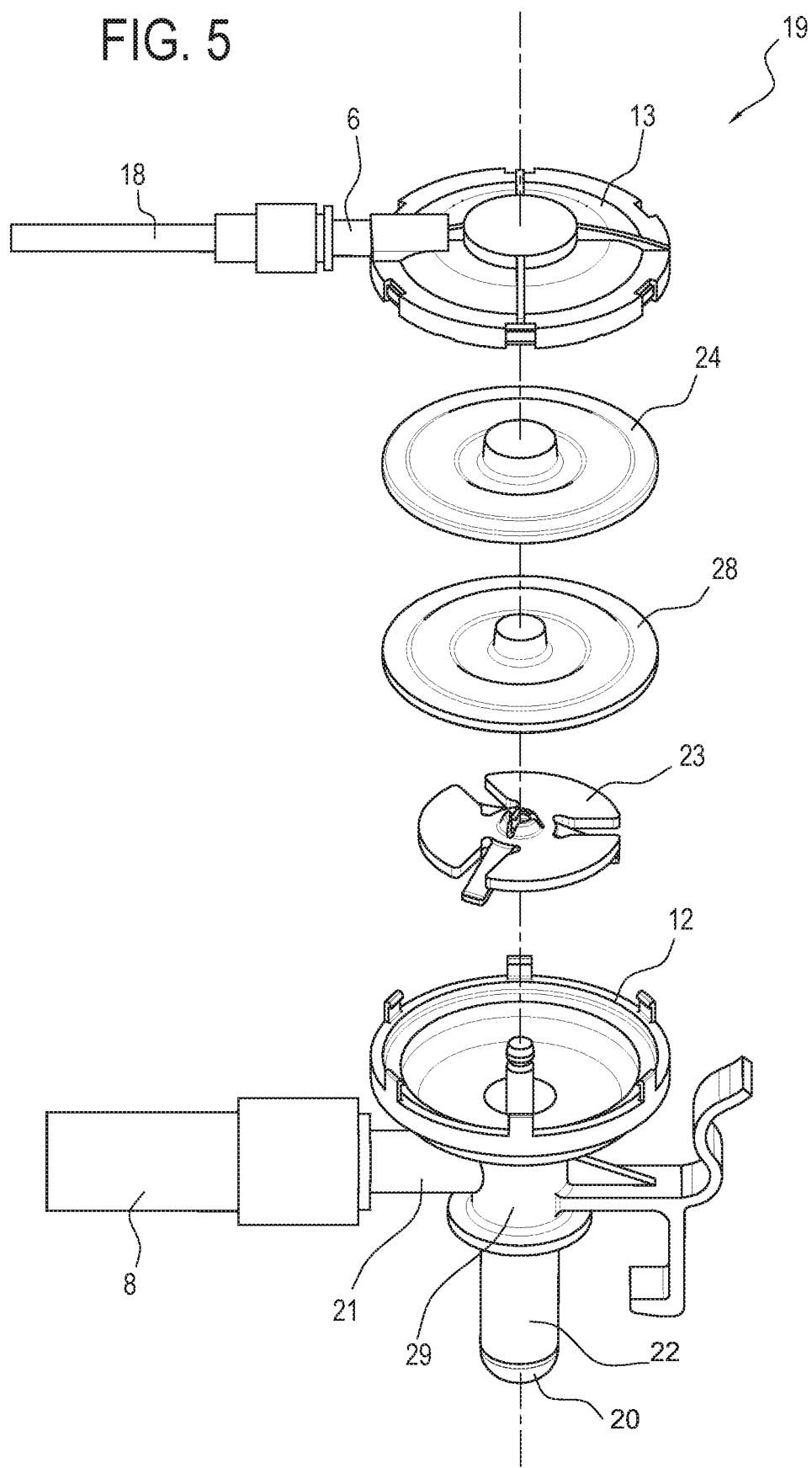
FIG. 5 illustrates the valve schematically and with some parts removed in an exploded view to better illustrate its components.

With reference to FIGS. 2 to 4, each pneumatically actuated valve 19 comprises a valve body 29 with an inlet duct 22 and an outlet duct 21. The inlet duct 22 of the valve 19 is connected to a corresponding feeding container 3 containing a base product or an additive, while the outlet duct 21 of the valve 19, attached to the valve body 29, is connected to a withdrawing duct 8 of the network 15.

Operating inside the valve 19 there are shut-off means 7, 20 for selectively interrupting or allowing the connection between the inlet duct 22 and the outlet duct 21. The shut-off means 7, 20 comprise a shutter 20, which acts on end walls of the inlet duct 22, and a stem 7, which extends longitudinally within the valve body 29.

To actuate the shutter 20 by means of the stem 7, there is a control chamber 27 associated with the valve body 29 on the side opposite to the inlet duct 22.

The control chamber 27 comprises a first shell 12, which is attached to (made as one piece with) the valve body 29, and a second shell 13, which is associated with the first shell 12 through the perimeter edge—interposed between the first and second shells—of a first deformable membrane 28 constituting a flexible wall which delimits a closed sealed space inside the control chamber 27.

The closed sealed space can be selectively connected to a source of pressurized fluid, specifically compressed air, to deform the deformable membrane 28 and actuate the shutter 20 by means of the stem 7.

According to the disclosure, the first deformable membrane 28 has a second deformable membrane 24 associated with it, also designed to delimit the closed space and mechanically connected to the stem 7 to operatively act thereon and actuate the shutter 20.

It should be noted that the second deformable membrane 24 has one face adhering to a corresponding face of the first membrane 28.

It is stressed that the perimeter edges of both the first and the second membrane 28, 24 are interposed between the first and the second shell in order to create the seal of the closed space.

Elastic means, comprising a cup spring 23, are supported by the inner side larger diameter end of the first shell 12 and act on the smaller diameter end on the side of the first or the second membrane 28, 24 facing the stem 7. The spring 23 acts on the membranes 28, 24 to return the shutter 20 to, and/or hold it at, the position where it closes the inlet duct 22.

That way, a pneumatically actuated valve 19 is created which is normally closed by effect of the elastic reaction of the cup spring 23.

The closed space is connected to the source of pressurized fluid through a spigot 6 that originates from the second shell 13 and connects with a tube 18, such as a hose, for example.

The tube 18 leads into a compressed air distributor 17 controlled by the control unit 11 which commands enablement thereof when the valve 19 must be opened and disablement thereof when the valve 19 is to be closed.

It should be noted that, normally, that is to say, when compressed air is not being supplied to the valve 19 (more precisely, when compressed air is not being supplied to the control duct 18), the shutter 20 is at the position where it interrupts the connection between the inlet duct 22 and the outlet duct 21.

The provision of the two membranes 28 and 24, first and second, to seal the closed space, besides giving greater structural strength to the deformable assembly which they constitute, also allows creating a safety system for the valve such that breakage of one of the first or the second valve 28, 24 causes the seal of the closed space to be broken towards the outside, thereby preventing the pressurized fluid from flowing through the inlet or the outlet duct 22, 21, which is protected by the membrane that remains whole.

In particular, if one of the membranes breaks, pressurized air is prevented from flowing through the inlet duct 22 to reach the feeding container 3 and thus cannot cause the latter to burst and to spill its contents into the frame 2 of the machine 1. The problems mentioned in the introductory section hereof are thus avoided.

The valve 19 described up to here is thus installed on a machine 1 for the production of liquid or semi-liquid food products, obtained from base and/or additive products contained in corresponding feeding containers 3 and withdrawn by means of a network 15 of withdrawing ducts 8 leading to a processing chamber 5.

The valve 19 can be activated and deactivated independently of the remaining valves 19 to connect and disconnect the respective feeding container 3 to and from the withdrawing duct network 15 and the processing chamber 5.

The machine 1 also comprises a compressor 16 adapted to generate compressed air which is then selectively sent to a compressed air distributor 17, connected to the compressor 16, according to commands received by the operation and control unit 11.

A plurality of service hoses 18 connect the compressed air distributor 17 to the valves 19 to bring a flow of compressed air to each of the valves. In effect, the compressed air distributor 17 is configured to be able to release an air flow independently to each of the valves 19.

The presence of different feeding containers 3 with respective valves 19 which are controllable independently makes it possible to switch in a very quick, easy and reliable manner from one feeding container to another, thereby avoiding prolonged machine down times.

The fact that the valve 19 is pneumatic and that the machine 1 is equipped with a compressor 16 and a compressed air distributor 17 means that the processing chamber 5 can be fed in a particularly reliable manner with any type of basic ice cream product under all typical shop working conditions.

According to another aspect, the machine 1 is equipped with a dispenser 39 connected to the processing chamber 5 to serve the product from the processing container 5.

All the aims set out above are thus achieved.

More specifically, a valve is provided for controlling the supply of products withdrawn from corresponding flexible containers in a machine for making ice cream or liquid or semi-liquid products with a constructional configuration such as to ensure correct operation at all times or in any case to prevent the pressurized air used for its operation from reaching the container it is connected to.

That way, a machine is provided for making liquid or semi-liquid products which is equipped with the above mentioned valve in such a way as to prevent the pressurized air used for its operation from breaking the flexible containers and from causing the base products contained therein to spill into the machine, thus allowing prolonged machine down time to be avoided.

Figure 6:
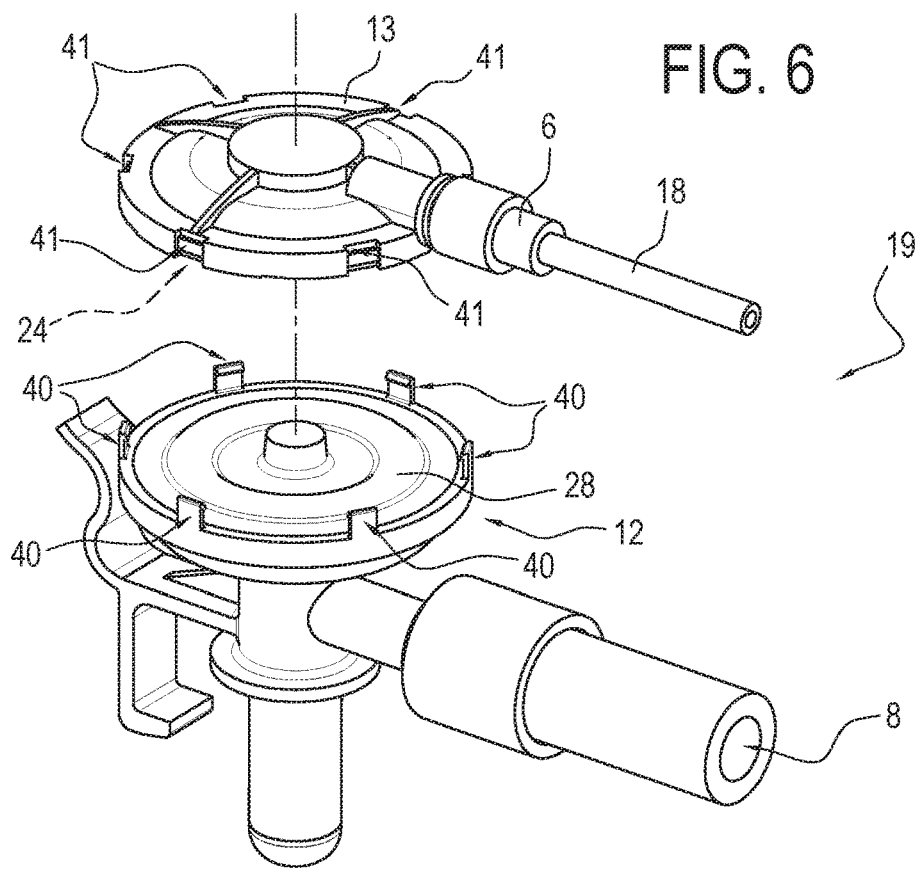
FIGS. 6 and 7 are, respectively, a perspective view and a cross-sectional view of the valve of the preceding figures in a partly assembled condition.
Figure 7:
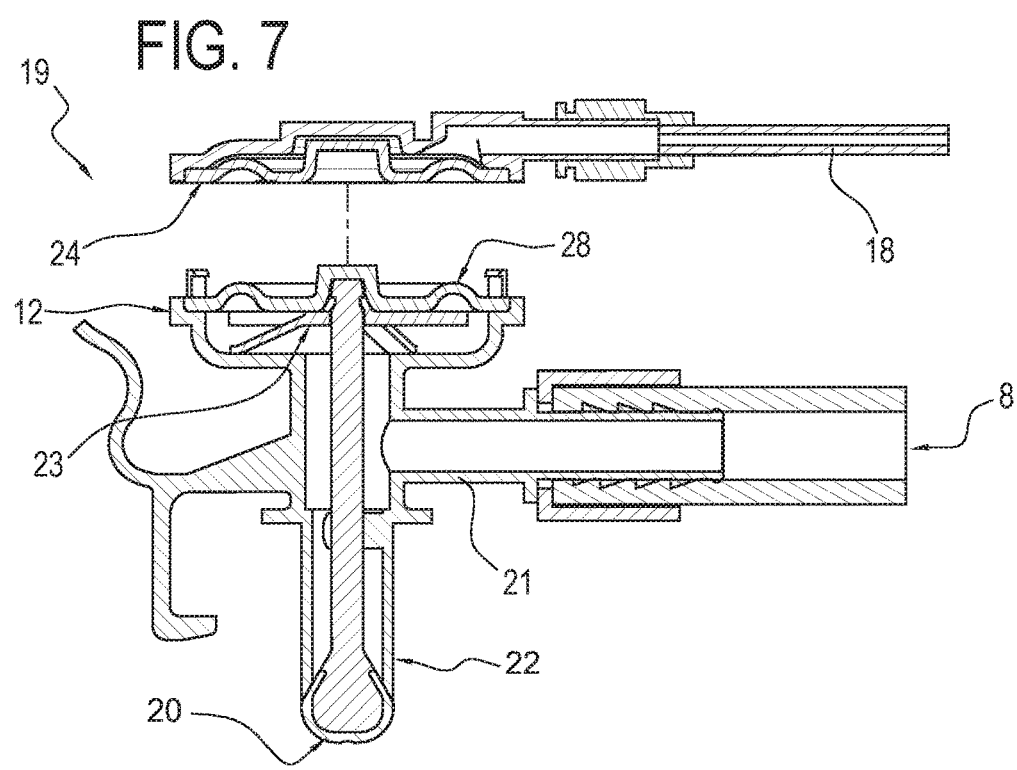

As may be observed from FIGS. 6 and 7, the first deformable membrane 28 is coupled to the first shell 12.

Preferably, the first deformable membrane 28 is rigidly coupled (welded) to the first shell 12.

Preferably, the first deformable membrane 28 is induction welded to the first shell 12.

Again with reference to FIGS. 6 and 7, the second deformable membrane 24 is coupled to the second shell 13.

Preferably, the second deformable membrane 24 is rigidly coupled (welded) to the second shell 13.

Preferably, the second deformable membrane 24 is induction welded to the second shell 13.

It should be noted, therefore, as illustrated in FIGS. 6 and 7, that the first shell 12 coupled to the first deformable membrane 28 is mechanically connected to the second shell 13 which is in turn coupled to the second membrane 24.

More specifically, one between the first and the second shell 12, 13 is provided with protrusions 40 while the other between the first and the second shell 12, 13 is provided with seats 41 adapted to receive the projections 40.

Inserting the protrusions 40 into the seats 41 causes the first shell 12 to be coupled to the second shell 13.

It should then be noted that once the first and the second shells 12, 13 are coupled to each other, the coupling between them is not sealed (not fluid tight).

Thus, if the first membrane 28 breaks, the base liquid contained inside the feeding container 3 flows out of the valve 19 (through the coupling zone between the first and the second shell).

That way, the breakage is immediately perceptible to an operator, who becomes immediately aware of the fault in the valve 19.

In the same way, it should be noted that if the second membrane 24 breaks, pressurized air flows out (when the valve is activated) through the coupling zone between the first and the second shell 12, 13. Once again, the fault is immediately perceptible to an operator, in this case because of the unusual sound made by the pressurized air flowing out through the valve 19.

Thus, the mechanical coupling between the first shell 12 and the second shell 13 is not a fluid tight coupling which, in this specific case, is made by fitting together the protrusions 40 and the receiving seats 41.

More precisely, the coupling between the first and the second shell 12, 13 defines a space between the first membrane 28 and the second membrane 24 without a fluid seal, as illustrated in FIGS. 6 and 7.

Preferably, the protrusions 40 are coupled to the seats 40 by pressure or by deformation (for example, using specific tools).

Preferably, the first and/or the second membrane 28, 24 is/are made of an elastomer (still more preferably, a thermoplastic elastomer).

It should be noted that the use of a thermoplastic elastomer for the first and/or the second membrane 28, 24 advantageously makes welding to the respective shell 12, 13 possible.

As regards the first shell 12 and/or the second shell 13, it should be noted that the first shell 12 and/or the second shell 13 is/are made of a resin (preferably acetalic resin). According to another aspect, this disclosure relates to a machine for the production of liquid or semi-liquid food products, comprising:

a frame 2;

a plurality of deformable feeding containers 3 which contain a liquid or semi-liquid base mixture, and such that the volume occupied by each first container 3 depends on a quantity of base mixture inside the same first container 3);

a processing chamber 5 for said base mixture, comprising a stirrer and thermal treatment means for processing said base mixture, which operate in conjunction to convert the base mixture into a liquid or semi-liquid product;

a network 15 of withdrawing ducts 8 connecting the feeding containers 3 to the processing chamber 5, and configured to allow operative connection of each of the feeding containers 3 to the processing chamber 5 and to transfer the base mixture from each of the feeding containers 3 to the processing chamber 5;

supporting means 9 for the feeding containers 3, operatively associated with the frame 2;

an electronic control unit 11 for operating and controlling the machine 1; the network 15 of withdrawing ducts 8 being connected to a plurality of pneumatically actuated valves 19 (of the type described above), each of the valves associated with one of the feeding containers 3 being activated and deactivated independently of the remaining valves 19 to allow the corresponding container 3 to be connected to the processing chamber 5.

What is claimed is:

1. A pneumatically actuated valve, comprising:
a valve body,
an inlet duct connected to the valve body,
an outlet duct connected to the valve body,
a shut-off device including a movable shutter acting to selectively interrupt or allow a connection between the inlet duct and the outlet duct,
a control chamber operatively connected with the valve body and including a first deformable membrane forming a flexible wall that delimits a closed sealed space within the control chamber and operatively acting on the shut-off device, with the closed sealed space selectively connectable to a source of pressurized fluid to deform the first deformable membrane and operate the shut-off device,
a second deformable membrane connected to the first deformable membrane and suitable for delimiting the closed sealed space and operatively acting on the shut-off device,
wherein the movable shutter is operatively coupled to the first and second deformable membranes,
wherein the control chamber comprises a first shell coupled to the valve body and a second shell connected to the first shell,
wherein one of the first shell and the second shell includes protrusions while the other of the first shell and the second shell includes seats suitable for receiving the protrusions to define a disengageable coupling between the first shell and the second shell, with each of the protrusions coupling with a corresponding one of the seats,
wherein the first deformable membrane and the second deformable membrane are directly in contact with one another.

2. The pneumatically actuated valve as claimed in claim 1, wherein the pneumatically actuated valve is a normally closed valve.

3. The pneumatically actuated valve as claimed in claim 1, wherein the disengageable coupling between the first and the second shell defines a space between the first deformable membrane and the second deformable membrane without a fluid seal.

4. The pneumatically actuated valve as claimed in claim 1, wherein the second deformable membrane is disposed with one face adhering to a corresponding face of the first deformable membrane.

5. The pneumatically actuated valve as claimed in claim 1, wherein the closed sealed space is connected to the pressurized fluid source by a spigot that originates from the second shell and opens into a tube which connects with a compressed air distributor operatively controlled by a control unit which opens the compressed air distributor when the pneumatically actuate valve must be opened and closes the compressed air distributor when the pneumatically actuate valve is to be closed.

6. The pneumatically actuated valve as claimed in claim 1, wherein the movable shutter acts on the inlet duct, and the shut-off device further comprises a spring acting on the first and second deformable membranes for at least one chosen from the group including: returning the shutter to a position for closing the inlet duct, and holding the shutter at the position for closing the inlet duct.

7. The pneumatically actuated valve as claimed in claim 6, wherein:
the shutter includes a stem extending along the valve body, the shutter being connected to the first and second deformable membranes by the stem, and wherein the spring includes a cup spring including an inner side larger diameter end and a smaller diameter end, the inner side larger diameter end being supported by the first shell and the smaller diameter end being arranged on a side of either the first or the second deformable membranes facing the stem.

8. The pneumatically actuated valve as claimed in claim 6, wherein the shutter operably acts on end walls of the inlet duct.

9. A machine for producing a liquid or semi-liquid food product, comprising:
a frame;
a plurality of deformable feeding containers which contain a liquid or semi-liquid base mixture, and such that a volume occupied by each of the plurality of deformable feeding containers depends on a quantity of base mixture within the each of the plurality of deformable feeding containers;
a processing chamber for the base mixture, comprising a stirrer and a thermal treatment system including a heat exchanger for processing the base mixture, which cooperate with each other to convert the base mixture into the liquid or semi-liquid food product;
a network of withdrawing ducts connecting the plurality of deformable feeding containers to the processing chamber, and configured to allow operative connection of each of the plurality of deformable feeding containers to the processing chamber and for transferring the base mixture from each of the plurality of deformable feeding containers to the processing chamber;
supporting platforms for the plurality of deformable feeding containers, operatively associated with the frame;
an electronic control unit for operating and controlling the machine;
the network of withdrawing ducts being connected to a plurality of pneumatically actuated valves as claimed in claim 1, each of the pneumatically actuated valves associated with one of the plurality of deformable feeding containers being actuated and deactivated independently of the other pneumatically actuated valves to connect the one of the plurality of deformable feeding containers to the processing chamber.

10. The machine as claimed in claim 9, and further comprising an interface connected to the electronic control unit and including control commands, which are operable to control the pneumatically actuated valves so as to selectively place the one of the plurality of deformable feeding containers in fluid communication with the processing chamber.

11. The machine as claimed in claim 9, and further comprising a transfer pump operatively interposed between the plurality of deformable feeding containers and the processing chamber for transferring fluid from the plurality of deformable feeding containers to the processing chamber.

12. The machine as claimed in claim 11, wherein the transfer pump is a peristaltic pump.

* * * * *